United States Patent
Huh

(10) Patent No.: US 10,996,469 B2
(45) Date of Patent: May 4, 2021

(54) METHOD AND APPARATUS FOR PROVIDING DRIVING INFORMATION OF VEHICLE, AND RECORDING MEDIUM

(71) Applicants: Hyundai Motor Company, Seoul (KR); KIA Motors Corporation, Seoul (KR)

(72) Inventor: Dong Pil Huh, Seoul (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days.

(21) Appl. No.: 16/416,782

(22) Filed: May 20, 2019

(65) Prior Publication Data
US 2020/0192091 A1    Jun. 18, 2020

(30) Foreign Application Priority Data
Dec. 18, 2018 (KR) .................. 10-2018-0163885

(51) Int. Cl.
| | | |
|---|---|---|
| G09G 5/00 | (2006.01) | |
| G02B 27/01 | (2006.01) | |
| G06T 11/60 | (2006.01) | |
| B60R 1/00 | (2006.01) | |
| G01C 21/36 | (2006.01) | |
| B60K 35/00 | (2006.01) | |
| G06F 3/01 | (2006.01) | |
| G08G 1/0969 | (2006.01) | |

(52) U.S. Cl.
CPC .......... *G02B 27/0101* (2013.01); *B60K 35/00* (2013.01); *B60R 1/00* (2013.01); *G01C 21/3688* (2013.01); *G02B 27/0179* (2013.01); *G06F 3/013* (2013.01); *G06T 11/60* (2013.01); *B60K 2370/149* (2019.05); *B60K 2370/1529* (2019.05); *B60K 2370/166* (2019.05); *B60K 2370/177* (2019.05); *B60K 2370/193* (2019.05); *B60R 2300/205* (2013.01); *B60R 2300/302* (2013.01); *B60R 2300/304* (2013.01); *B60R 2300/605* (2013.01); *G02B 2027/014* (2013.01); *G02B 2027/0138* (2013.01); *G02B 2027/0141* (2013.01); *G02B 2027/0187* (2013.01); *G08G 1/0969* (2013.01)

(58) Field of Classification Search
CPC ...................................................... G06F 3/013
See application file for complete search history.

(56) References Cited

U.S. PATENT DOCUMENTS

| | | | | |
|---|---|---|---|---|
| 2010/0253541 | A1* | 10/2010 | Seder | G01S 13/931 340/905 |
| 2014/0211319 | A1* | 7/2014 | Park | G02B 27/01 359/630 |
| 2017/0187963 | A1* | 6/2017 | Lee | G06F 3/013 |

* cited by examiner

*Primary Examiner* — Nan-Ying Yang
(74) *Attorney, Agent, or Firm* — Brinks Gilson & Lione

(57) ABSTRACT

Disclosed is a method of providing driving information of a vehicle, including tracking and recognizing driver gaze of the vehicle, checking whether the driver gaze is directed toward a display of the vehicle, upon checking that the driver gaze is directed toward the display of the vehicle, checking coordinates of an actual position corresponding to a point on the display, toward which the driver gaze is directed, acquiring an image corresponding to the checked coordinates, and displaying the acquired image using an augmented reality provision unit included in the vehicle.

9 Claims, 3 Drawing Sheets

METHOD AND APPARATUS FOR PROVIDING DRIVING INFORMATION OF VEHICLE, AND RECORDING MEDIUM

CROSS REFERENCE TO RELATED APPLICATION

This application claims priority to and the benefit of Korea Patent Application No. 10-2018-0163885, filed on Dec. 18, 2018, the entire contents of which are hereby incorporated by reference.

FIELD

The present disclosure relates to a method and apparatus for providing driving information of a vehicle, a program, and a recording medium, and more particularly, to a method and apparatus for providing driving information of a vehicle related to visualization of the vehicle environment.

BACKGROUND

The statements in this section merely provide background information related to the present disclosure and may not constitute prior art.

In order to project information onto the eye of a driver, a head up display (HUD) or a virtual reality (VR) device may be provided in a vehicle.

For example, a HUD is a front display device designed to display driving information of a vehicle on a front glass of a vehicle. The HUD device forms and displays a virtual image to enable a driver to recognize various types of information such as a speed, a fuel level, temperature, and a warning direction, which are displayed on a cluster of the vehicle.

A driver has high concentration on a front side by using the HUD device to advantageously reduce the risk of accidents. In addition, the HUD device provides a night vision function for identifying a front object during the nighttime as well as information of a cluster.

However, a conventional HUD or VR device has an effect of displaying various pieces of information to a driver without gaze dispersion, but has high risk of traffic accidents because incorrect information is transmitted due to mismatch between an actual object and image information or insufficient information on a hidden spot such as a front blind spot.

SUMMARY

Accordingly, aspects of the present disclosure are directed to a method and apparatus for providing driving information of a vehicle.

In one aspect, a method and apparatus for providing driving information of a vehicle are described, a program, and a recording medium, for providing image information matching an object that is actually seen by a driver of the vehicle or an image of a blind spot that is not viewed by a side mirror or the like.

In one aspect, a method of providing driving information of a vehicle includes tracking and recognizing driver gaze of the vehicle, checking whether the driver gaze is directed toward a display of the vehicle, upon checking that the driver gaze is directed toward the display of the vehicle, checking coordinates of an actual position corresponding to a point on the display, toward which the driver gaze is directed, acquiring an image corresponding to the checked coordinates, and displaying the acquired image using an augmented reality provision unit included in the vehicle.

The acquiring the image may include searching for an apparatus around the checked coordinates and receiving image information from the retrieved apparatus, or generating a virtual image based on information around the checked coordinates.

The method may further include, upon checking that the driver gaze is directed outside the display of the vehicle, recognizing a position of the vehicle and acquiring image information related to the position of the vehicle, matching the image information related to the position of the vehicle and gaze direction image information of the driver, and when the image information related to the position of the vehicle and the gaze direction image information of the driver match, displaying the matched information using the augmented reality provision unit included in the vehicle.

The gaze direction image information of the driver may be acquired by an image receiver included in the vehicle.

The acquiring the image information related to the position of the vehicle may include recognizing the position of the vehicle by a global positioning system (GPS) included in the vehicle, and receiving the recognized image information related to the position of the vehicle.

The image information related to the position of the vehicle may be received from a map database (DB) of a surrounding road at the position.

The acquiring the image information related to the position of the vehicle may include recognizing a driving path of the vehicle from a navigation device included in the vehicle, and receiving image information related to the position of the recognized driving path.

In another aspect, a computer readable recording medium executes the method of providing driving information of the vehicle by a processor.

In another aspect, an apparatus for providing driving information of a vehicle includes a gaze track recognition unit included in the vehicle and configured to track driver gaze, a navigation device including a display configured to display an image related to driving of the vehicle, a communication unit configured to receive image information related to a position of the vehicle, an augmented reality provision unit configured to provide an image in a driver direction of the vehicle, and a controller configured to control operations of the gaze track recognition unit, the navigation device, the communication unit, and the augmented reality provision unit.

The apparatus may further include a global positioning system (GPS) included in the vehicle and configured to recognize the position of the vehicle.

The apparatus may further include a database (DB) included in the vehicle and configured to have map information of a surrounding load of a position at which the vehicle drives.

The augmented reality provision unit may form an image of the driver gaze direction of the vehicle from traffic information around the vehicle.

The apparatus may further include a sensing unit included in the vehicle, wherein the augmented reality provision unit may form an image in the driver gaze direction of the vehicle from sensing data around the vehicle, measured by the sensing unit.

Further areas of applicability will become apparent from the description provided herein. It should be understood that the description and specific examples are intended for purposes of illustration only and are not intended to limit the scope of the present disclosure.

DETAILED DESCRIPTION

In order that the disclosure may be well understood, there will now be described various forms thereof, given by way of example, reference being made to the accompanying drawings, in which:

Arrangements and aspects may be described in detail with reference to the following drawings in which like reference numerals refer to like elements and wherein.

Figure 5:
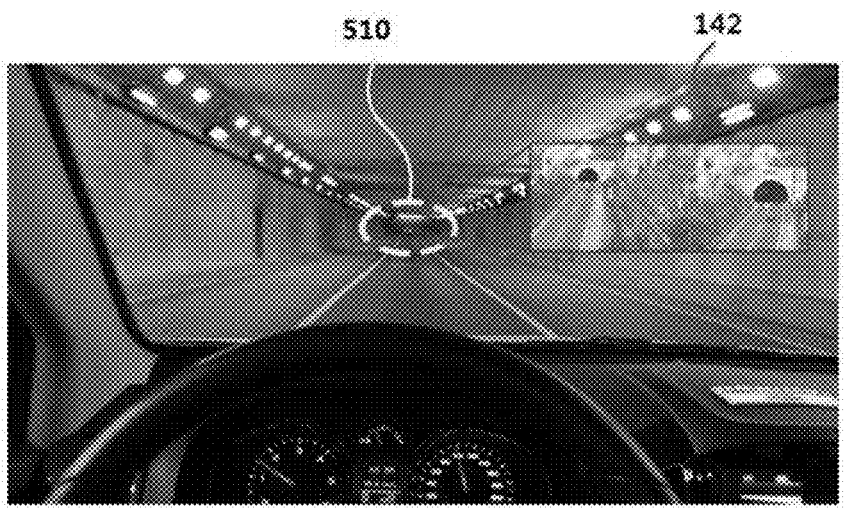
Figure 6:

FIG. 5 is a diagram showing an example of a form in which an image of corresponding coordinates is displayed when driver gaze is recognized outside a display according to an aspect of the present disclosure; and FIG. 6 is a diagram showing another example of a form in which an image of corresponding coordinates is displayed when driver gaze is recognized outside a display according to an aspect of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

The following methods and vehicle controllers according to various aspects will be described in more detail with reference to the accompanying drawings. Terms used therein are used only for illustrative purposes and are not intended to limit the scope of the present disclosure.

The term "comprises", "includes", "arrange", or "has" described herein should be interpreted not to exclude other elements but to further include such other elements since the corresponding elements may be included unless mentioned otherwise.

The singular expressions including "the" in the present specification and claims include the plural expressions unless clearly specified otherwise in context. In addition, the term "and/or" includes any and all combinations of one or more of the associated listed items.

A method and apparatus for providing driving information of a vehicle according to aspects are not limited to a vehicle, and may be used in vehicles moveable with a predetermined speed other than an automobile, for example, a two-wheeled vehicle, an electric bicycle, or an airplane in a hangar. In addition, when a vehicle performs an operation such as driving or parking, an image of a blind spot depending on a heading direction on a navigation path of the vehicle or a driver gaze direction may be received from a surrounding server or the like and may be displayed by an augmented reality device.

Figure 1:
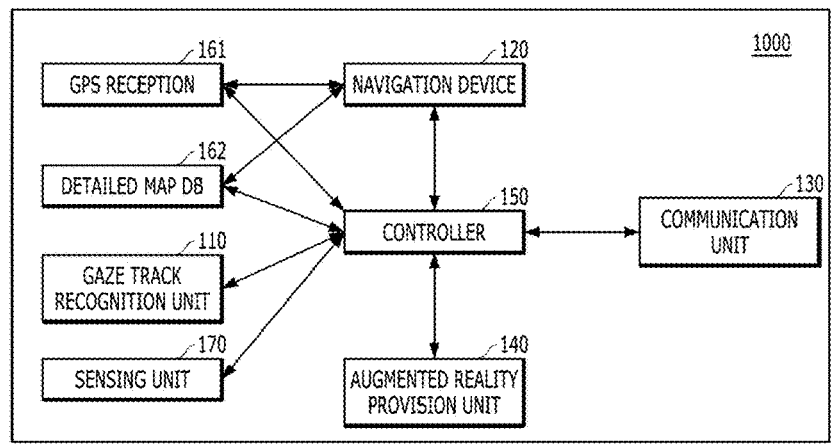
FIG. 1 is a diagram showing a configuration of a vehicle driving information provision apparatus according to an aspect of the present disclosure.
Figure 2:
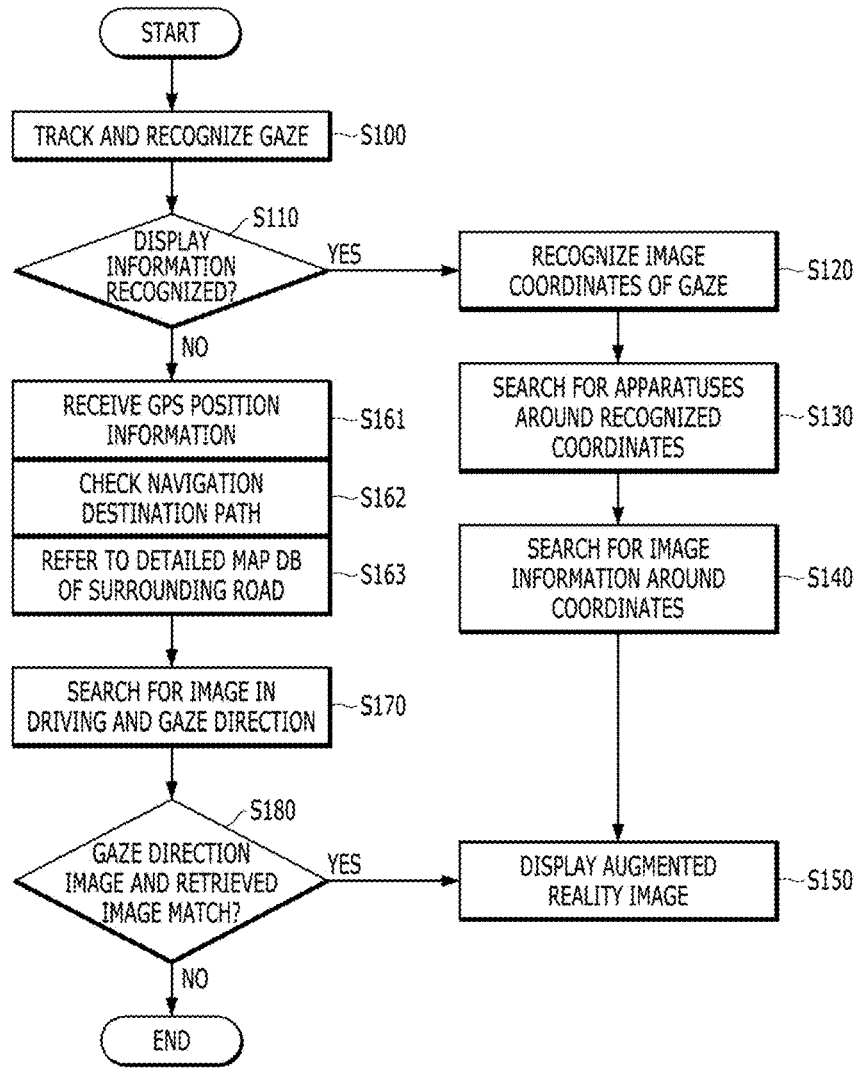
FIG. 2 is a diagram showing a configuration of a vehicle driving information provision method according to an aspect of the present disclosure.

FIG. 1 is a diagram showing a configuration of a vehicle driving information provision apparatus according to an aspect. FIG. 2 is a diagram showing a configuration of a vehicle driving information provision method according to an aspect. Hereinafter, with reference to FIGS. 1 and 2, a method and apparatus for providing driving information of a vehicle, a program, and a recording medium according to aspects will be described.

A vehicle driving information provision apparatus 1000 according to an aspect may include a gaze track recognition unit 110, a navigation device 120, a communication unit 130, an augmented reality provision unit 140, a controller 150, a global positioning system (GPS) 161, a detailed map database (DB) 162, and a sensing unit 170.

First, the gaze track recognition unit 110 included in a vehicle may track and recognize driver gaze through a camera for photographing at least a face of a driver, for example, an in-cabin camera (S100). In this case, the gaze track recognition unit 110 may determine a driver gaze direction and, simultaneously, may also acquire a camera image of a front side of the vehicle to recognize whether an obstacle is present in the driver gaze direction. The controller 150 may check whether the driver gaze is directed toward a display of the vehicle based on the recognition result of the gaze track recognition unit 110 (S110). When the driver gaze is directed toward the display of the vehicle ("YES" of S110), the controller 150 may recognize coordinates information on a navigation map toward which the driver gaze is directed (S120).

In detail, the controller 150 may determine a point, that is, coordinates of a display, on which the driver gaze is focused, based on the recognition result of the gaze track recognition unit 110, and the coordinates of the display may be re-converted into coordinates on a map on which a corresponding point is indicated. In other words, pixel(s) on the display, on which the driver gaze is focused, may be determined by tracking the driver gaze, and actual coordinates (latitude/longitude) corresponding to a position on a map (or a camera image) displayed through the corresponding pixel(s) may be recognized based on the determination result.

The controller 150 may search for apparatuses around the recognized coordinates (S130). In detail, the controller 150 may search for an image capturing apparatus present around the recognized coordinates, and for example, the image capturing apparatus may include the Internet of things (IoT) camera, a closed circuit television (CCTV), or a camera included in a surrounding vehicle.

The controller 150 may search for and receive image information corresponding to the recognized coordinates from the retrieved apparatus (S140). In this case, the received image information may be obtained by capturing an image in real time or pre-capturing an image through the aforementioned retrieved image capturing apparatus. In addition, when the image around the corresponding coordinates, that is, the real-time image or pre-captured image of the coordinates toward which the driver gaze is directed is retrieved and received, an augmented reality image may be displayed by the augmented reality provision unit 140 included in the vehicle (S150).

As a result of track and recognition of the driver gaze, when the driver gaze is directed to the outside of the display of the vehicle ("NO" of S110), it may be difficult to use the aforementioned method of recognizing coordinates of a point on a display, toward which the driver gaze is directed, and searching for and receiving an image around the corresponding coordinates.

In this case, the controller 150 may acquire image information related to a position and driving direction of the vehicle, and a position toward which the driver gaze is directed.

In detail, the controller 150 may search for and acquire an image in the driving direction of the vehicle. The position of the vehicle may be checked through a global positioning system (GPS) included in the vehicle (S161) and the driving direction may be checked based on a destination of a navigation device included in the vehicle (S162). Needless to say, the current position and the driving direction may be determined with further reference to the detailed map database (DB) (S163).

When the position and driving direction of the vehicle are determined, the controller 150 may search for image information of a gaze direction along with an image in the driving direction of the vehicle (S170). In detail, in order to search for image information in the gaze direction or image information on a position hidden by an obstacle of a blind spot on a driving path, the controller 150 may collect image information of a CCTV and surrounding image information (e.g., an image captured by a camera included in a surrounding vehicle) in the heading direction.

For example, the image information of the gaze direction may be acquired by checking a region toward which the driver gaze of the vehicle is directed via the aforementioned gaze track and recognition by the controller 150 and selecting and receiving an image of the region toward which the driver gaze is directed among images in the aforementioned driving direction.

The gaze direction image information of the driver may be acquired by an image receiver included in the vehicle and, for example, may be acquired via photograph of a camera installed in a front, lateral, or rear side of the vehicle.

The image information related to the position of the vehicle may match the gaze direction image information of the driver, and in detail, whether an image in the gaze direction and the retrieved image match may be checked (S180). That is, when the image in the driver gaze direction matches the retrieved image, the matched image may be displayed by the augmented reality provision unit 140 included in the vehicle (S150). In this case, according to the image information on a position hidden by an obstacle of a blind spot, the augmented reality provision unit 140 may be controlled to display an image of the corresponding position at an exact point in an actual visual field based on a detailed map.

When the aforementioned image information is not received through the aforementioned GPS, navigation device, or detailed map DB, a virtual image may be generated based on traffic information data or data received from the sensing unit 170 such as a radio detecting and ranging (RADAR) and may be displayed by the augmented reality provision unit.

When it is difficult to acquire or receive an image in a driving direction, an image in a blind spot, or an actual image of coordinates toward which driver gaze is directed, the controller 150 may generate a virtual image (e.g., when a current section is determined to be a congested section base on traffic information, vehicle images overlap each other.) based on images stored in a detailed map DB or a navigation device and may replace an actual image with the virtual image.

When the image in the driver gaze direction does not match the retrieved image, that is, when an image of a region toward which driver gaze is directed is different from an image retrieved from the aforementioned GPS or navigation device, an image of a direction in which driver gaze is actually directed may not be provided.

As described above, when an image of a direction in which driver gaze is directed is provided in the form of augmented reality, in particular, when the driver gaze direction is directed toward a blind spot due to an obstacle or the like, visibility of the driver may be provided.

For example, when a vehicle passes through a tunnel or drives on a slope or a sharp curve, a visual field of the driver may not be provided, and in this case, the driver may actually feel as though an image in a driver gaze direction is visible by the eye of the driver through the aforementioned method and apparatus.

Figure 3:
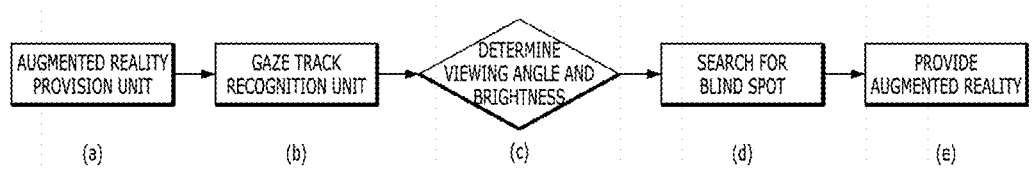
FIG. 3 is a diagram showing another configuration of a vehicle driving information provision apparatus and method according to an aspect of the present disclosure.

FIG. 3 is a diagram showing another configuration of a vehicle driving information provision apparatus and method according to an aspect. The vehicle driving information provision apparatus and method may have the same configuration as the aforementioned aspect, except that a viewing angle and brightness are further determined.

That is, an augmented reality apparatus (a) may be included in a vehicle, a front, rear, or lateral side, particularly, a blind spot of the vehicle, toward which driver gaze is directed, may be tracked to determine a viewing angle and brightness of the corresponding region (c) through an operation of a gaze track recognition unit (b), image information corresponding to the determined viewing angle and brightness may be searched for from a database (DB) of the vehicle itself or a surrounding server (d), the retrieved image information may be displayed by the augmented reality provision unit (e), and the driver may actually feel as though the corresponding front, rear, or lateral side, particularly, a blind spot of the vehicle is observed by the driver.

Hereinafter, a detailed example of a form in which an image of a gaze direction is displayed according to the aforementioned aspects will be described with reference to FIGS. 4 to 6.

Figure 4:
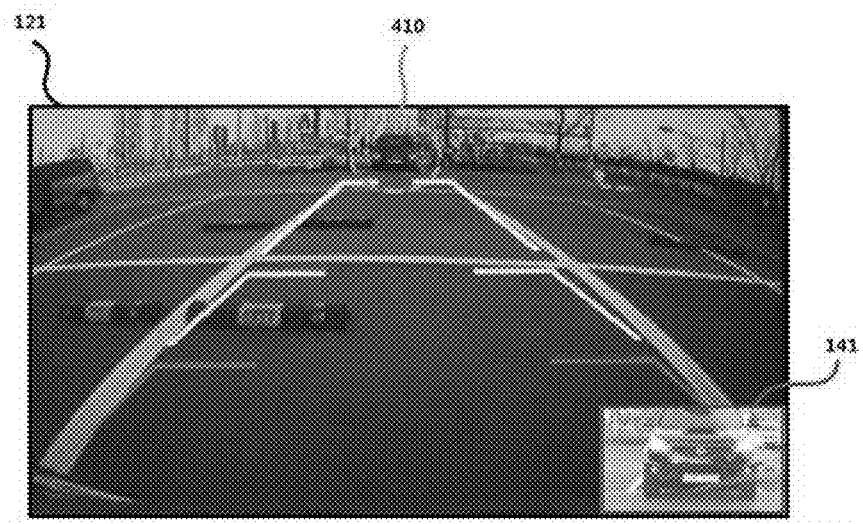
FIG. 4 is a diagram showing an example of a form in which an image of corresponding coordinates is displayed when driver gaze is recognized on a display according to an aspect of the present disclosure.

FIG. 4 is a diagram showing an example of a form in which an image of corresponding coordinates is displayed when driver gaze is recognized on a display according to an aspect.

In FIG. 4, it may be assumed that a driver manipulates a transmission to a reverse stage R and a display 121 of the navigation device 120 displays an image photographed through a rear camera instead of map information of the display 121. Referring to FIG. 4, as a recognition result of a driver gaze direction of the gaze track recognition unit 110, when driver gaze is directed toward one point 410 on the display 121 of the navigation device 120, the controller 150 may check actual coordinates of the corresponding point 410. Accordingly, the controller 150 may acquire a camera image 141 around corresponding coordinates through the communication unit 130 and may display the camera image 141 through the augmented reality provision unit 140.

FIG. 5 is a diagram showing an example of a form in which an image of corresponding coordinates is displayed when driver gaze is recognized outside a display according to an aspect.

Referring to FIG. 5, as a recognition result of a driver gaze direction of the gaze track recognition unit 110, when driver gaze is directed toward a tunnel end point 510 of a front side in a driving direction, but not a display, the controller 150 may check actual coordinates of the corresponding point 510. Accordingly, the controller 150 may acquire a camera image 142 around corresponding coordinates through the communication unit 130 and may display the camera image 142 through the augmented reality provision unit 140. As such, when it is difficult to recognize an external situation in front of a tunnel exit due to a slope of the tunnel exit, the driver may also pre-check the external situation, and the risk of accidents due to sudden brightening of the outside and temporary difficulty in providing a visual field may also be reduced.

FIG. 6 is a diagram showing another example of a form in which an image of corresponding coordinates is displayed when driver gaze is recognized outside a display according to an aspect.

Referring to FIG. 6, as a recognition result of a driver gaze direction of the gaze track recognition unit 110, when driver gaze is directed toward a left lane of a front side in a driving direction, but not a display, the controller 150 may check actual coordinates of the corresponding point. However, the left lane of the front side corresponds to a blind spot hidden by a vehicle 610 that drives on a front left side, and thus, the controller 150 may acquire a camera image 143 of a front side of the front vehicle 610 through the communication unit 130 and may display the camera image 143 through the augmented reality provision unit 140.

Although the case in which an image is displayed in a driver gaze direction according to aspect has been described thus far, the present disclosure is not limited thereto, and when an unexpected situation (e.g., a congested section in a front blind spot) occurs irrespective of the driver gaze direction, an image (e.g., a CCTV image in a congested section or a virtual vehicle congestion image) corresponding to the corresponding situation may be displayed.

The aforementioned vehicle driving information provision method may be recorded on a computer readable recording medium, and in this case, may be recorded as a program for executing the vehicle driving information provision method by a processor.

In a method and apparatus for providing driving information of a vehicle, a program, and a recording medium according to an aspect, when a vehicle performs an operation such as driving or parking, an image of a blind spot depending on a heading direction on a navigation path of the vehicle or a driver gaze direction may be received from a surrounding server or the like and may be displayed by an augmented reality device, and thus, image information matching an actual object may be provided to the driver of the vehicle.

It will be apparent to those skilled in the art that various modifications and variations can be made in the present disclosure without departing from the spirit or scope of the present disclosure.

What is claimed is:

1. A method of providing driving information of a vehicle, the method comprising:
   tracking, by an in-cabin camera, and recognizing driver gaze of the vehicle;
   checking, by a processor, whether the driver gaze is directed toward a display of the vehicle;
   upon checking that the driver gaze is directed toward the display of the vehicle, checking, with the processor, coordinates of an actual position corresponding to a point on the display, toward which the driver gaze is directed;
   acquiring, by the in-cabin camera, an image corresponding to the checked coordinates;
   displaying, with the processor, the acquired image using an augmented reality provision unit included in the vehicle;
   upon checking that the driver gaze is directed outside the display of the vehicle, recognizing a position of the vehicle and acquiring image information related to the position of the vehicle;
   matching the image information related to the position of the vehicle and gaze direction image information of the driver;
   acquiring a camera image of a front side of the vehicle to recognize whether an obstacle is present in the gaze direction image information of the driver by determining a driver gaze direction; and
   when the image information related to the position of the vehicle and the gaze direction image information of the driver match, displaying the matched information using the augmented reality provision unit included in the vehicle,
   wherein the gaze direction image information of the driver is acquired by an image receiver included in the vehicle and includes a viewing angle and brightness of a region where the driver gaze is directed to.

2. The method of claim 1, wherein acquiring the image includes:
   searching for an apparatus around the checked coordinates and receiving image information from the apparatus; or
   generating a virtual image based on information around the checked coordinates.

3. The method of claim 1, wherein acquiring the image information related to the position of the vehicle includes recognizing the position of the vehicle by a global positioning system (GPS) included in the vehicle, and receiving the image information related to the position of the vehicle.

4. The method of claim 3, wherein the image information related to the position of the vehicle is received from a map database (DB) of a surrounding road at the position.

5. The method of claim 1, wherein acquiring the image information related to the position of the vehicle includes recognizing a driving path of the vehicle from a navigation device included in the vehicle, and receiving image information related to the position of the recognized driving path.

6. A non-transitory computer readable recording medium for executing the method of providing driving information of the vehicle of claim 1 by a processor.

7. An apparatus for providing driving information of a vehicle, the apparatus comprising:
   an in-cabin camera for gaze track recognition included in the vehicle and configured to track driver gaze;
   a navigation device including a display configured to display an image related to driving of the vehicle;
   a communicator configured to receive image information related to a position of the vehicle;
   an augmented reality display configured to provide an image in a driver direction of the vehicle;
   a controller configured to control operations of the in-cabin camera, the navigation device, the communicator, and the augmented reality display; and
   a sensor included in the vehicle,
   wherein the augmented reality display forms an image in a direction of the driver gaze from traffic information around the vehicle,
   wherein the augmented reality display forms an image in the direction of the driver gaze from sensing data around the vehicle, measured by the sensor,
   wherein gaze direction image information of the driver is acquired by an image receiver included in the vehicle and includes a viewing angle and brightness of a region where the driver gaze is directed to, wherein the in-cabin camera is configured to acquire a camera image of a front side of the vehicle to recognize whether an obstacle is present in the gaze direction image information of the driver by determining a driver gaze direction, wherein the controller is configured to search for an image capturing apparatus present around a recognized coordinates, the image capturing apparatus includes at least one of an Internet of things (IoT) camera, a closed circuit television (CCTV), or a camera included in a surrounding vehicle, and wherein the controller is configured to search for and receive image information corresponding to the recognized coordinates, and the received image information is obtained by capturing an image in real time or pre-capturing an image through the image capturing apparatus.

8. The apparatus of claim 7, further comprising a global positioning system (GPS) included in the vehicle and configured to recognize the position of the vehicle.

9. The apparatus of claim 8, further comprising a database (DB) included in the vehicle and configured to have map information of a surrounding load of a position at which the vehicle drives.

* * * * *